May 2, 1950     A. S. KROTZ     2,506,367
DUAL WHEEL SUSPENSION
Filed Dec. 31, 1946
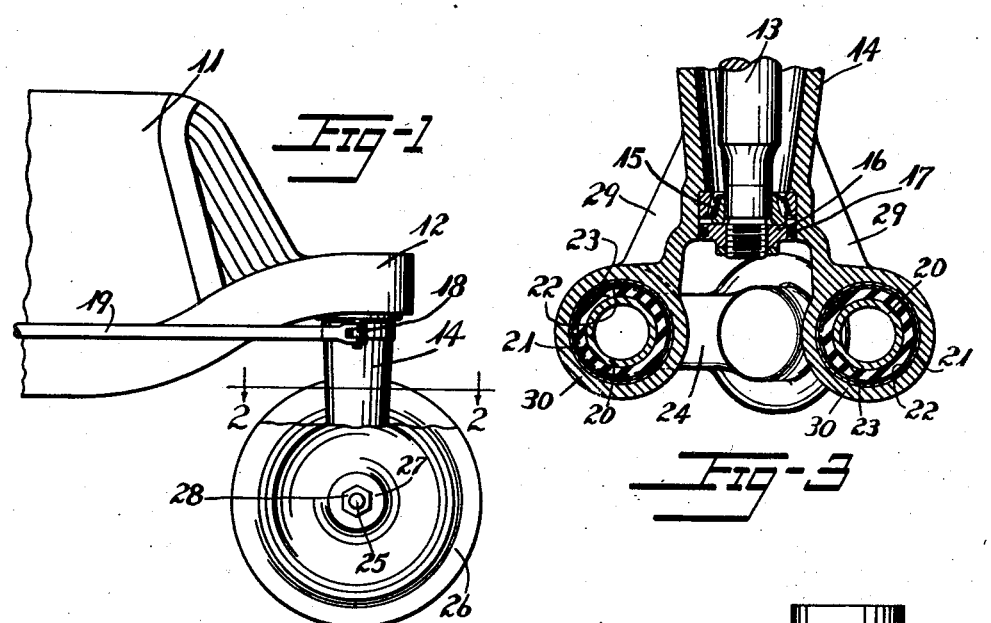
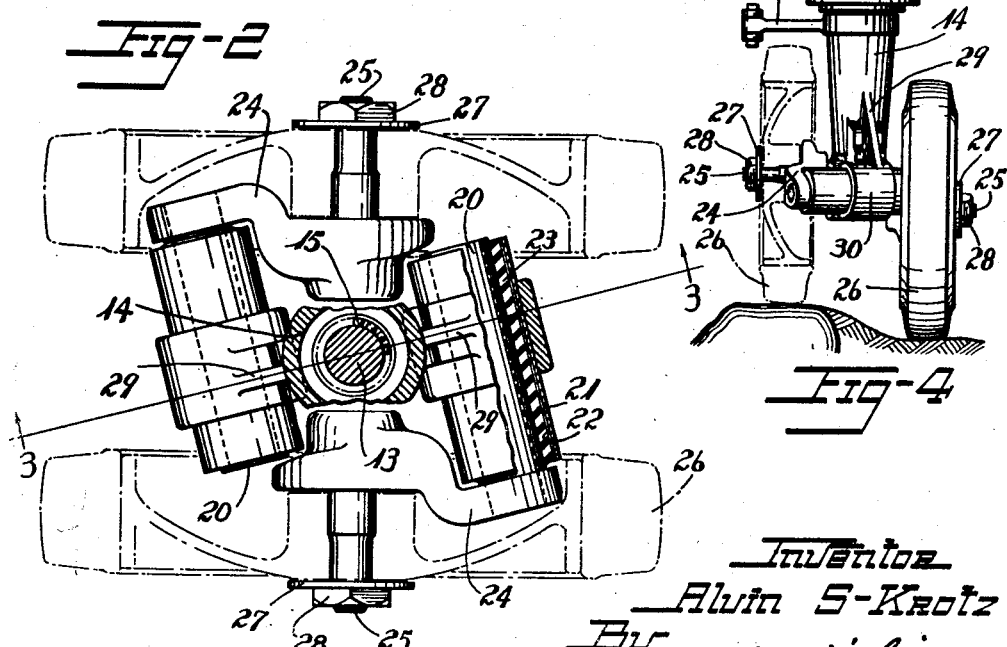
Inventor
Alvin S. Krotz
By
Atty.

Patented May 2, 1950

2,506,367

UNITED STATES PATENT OFFICE 2,506,367

DUAL WHEEL SUSPENSION

Alvin S. Krotz, Akron, Ohio, assignor to The B. F. Goodrich Company, New York, N. Y., a corporation of New York Application December 31, 1946, Serial No. 719,447

11 Claims. (Cl. 280—87)

1

This invention relates to vehicle suspensions and especially to dual or multiple wheel suspensions in which an independent type of suspension is desired and the space provided for the suspension is very limited.

The invention is useful especially where it is desirable that the wheel positions conform to the ground contour as for instance in the suspension of tractor dual front wheels which are mounted for steering movement. Other vehicles for which such independent, compact suspensions are desirable are heavy-duty trailers which are constructed with several closely-spaced transverse and longitudinal rows of wheels for supporting loads carried by the trailers.

The tricycle or row-type tractors are constructed with dual front wheels spaced closely together to facilitate steering and passage of the wheels between the rows of crops. Independent suspension of these wheels is desirable as the increased cushioning reduces the wear upon the wheels, tires and other parts of the tractor and the resultant prolongation of ground contact of the wheels improves the steering qualities and the resistance to sideslip of the tractor.

Objects of the invention are to provide an improved suspension for vehicles with closely mounted wheels, to provide a compact suspension arrangement, to provide longitudinal, vertical and transverse flexibility of the mounting, to provide ease of installation, effectiveness of operation and a minium of maintenance.

These and further objects will be apparent from the following description, reference being had to the accompanying drawings in which:

Fig. 1 is an elevation of a tractor having a front suspension constructed in accordance with and embodying the invention, parts being broken away.

Fig. 2 is a section of the suspension taken along line 2—2 of Fig. 1, parts being broken away and the wheels being shown in broken lines.

Fig. 3 is a section taken along line 3—3 of Fig. 2.

Fig. 4 is a front elevation of the tractor suspension with the wheels resting on uneven ground, one wheel being shown in broken lines.

A tractor 11 of the tricycle or row-type is partially shown in Fig. 1. The tractor 11 has a frame member 12 upon which is mounted a post 13 extending downward from the forward end of the tractor. A housing structure 14 is disposed telescopically about the post 13 and anti-friction bearing members such as roller bearings 15 are interposed between the post and housing structure at the upper and lower portions of the post

2 for limiting axial movement of the housing structure relative to the post and for reducing frictional resistance to turning of the housing structure about the post. A collar 16 is threaded on the lower end of the post 13 for securing the lower set of bearings 15 to the post and an annular sealing member 17 is disposed in a peripheral slot in the collar in such a manner that it will abut the housing structure 14 for sealing the bearings 15 from dirt or other foreign matter.

A steering arm 18 is mounted on the housing structure 14 for turning the housing structure about the post 13. The arm 18 extends radially outward from the structure, and a connecting rod 19 is mounted on the outer end for transferring motion of the steering mechanism to the steering arm 18.

A pair of integral tubular supporting members 30, 30 is disposed generally crosswise of the tractor at the lower portion and at opposite sides of the housing structure and reinforced by gussets 29. Spring assemblies are mounted in the tubular supporting members 30, 30 each spring assembly including a shaft 20 disposed therein. An outer sleeve 21 is disposed about the shaft 20 and a circumferentially discontinuous or split shell member 22 is interposed between the sleeve 21 and the shaft 20. A resilient body 23 of rubber or other rubber-like material is interposed between the split shell member 22 and the shaft 20 and mounted on the split shell and shaft by suitable means such as vulcanization.

The outer sleeve 21 is mounted in the respective tubular member 30 and may be secured to the member 30 by welding or in other suitable manner. The split shell member 22 is secured to the outer sleeve 21 as by keys or dowels which may be disposed in openings in the outer sleeve 21 and in the slot between the portions of the shell.

Each shaft 20 is connected by an arm 24 to a spindle 25 on which a wheel 26 of the vehicle is rotatably mounted. The wheel 26 is secured on the spindle 25 by a washer 27 and a nut 28, the latter of which is threaded on the spindle 25. As is shown for example in Fig. 2, the spring assemblies support the wheels 26, 26 through the shafts 22 of the springs in a cantilever fashion. These springs are obliquely disposed with respect to the plane of symmetry of the wheels, as shown, and are connected to the wheels by arms 24, 24, having a bent shape, which arrangement is advantageous in that it is compact and it reduces the tendency of the shafts to tilt in the rubber as a result of the cantilever action.

In operation, impacts and forces imposed upon one wheel 26 will be cushioned by the spring assembly of that respective wheel independently of the other wheel 26. An impact will tend to move the wheel 26 and the arm 24, which will tend to turn the shaft 19 with respect to the sleeve 21, stressing the resilient body 23 in torsional shear, which will cushion the tractor.

When a tractor is traveling over uneven ground as shown in Fig. 4, the spring assemblies will operate to allow both wheels 26, 26 to remain in contact with the ground, each wheel being independently sprung. In this manner the wheels 26 will move to conform to the contour of the ground, as shown, for example, in Fig. 4.

If desired, such features as camber, caster, toe-in and inclined pivot, may be incorporated.

Variations may be made without departing from the scope of the invention as it is defined in the following claims.

I claim:

1. A vehicle suspension comprising a structure mounted on the vehicle for steering movement about a generally vertical axis, supporting wheels disposed at opposite sides of said structure, a connecting arm individual to each wheel extending fore and aft of the vehicle and mounted for swinging movement about an axis generally transverse of the vehicle, and a spring individual to each wheel mounted between the wheel and said structure for independent springing movement of the wheel relative to said structure and for steering movement of both wheels and said structure about said generally vertical axis, said spring comprising inner and outer members, one of said members being mounted on said supported structure, the other of said members being secured to said arm and a body of resilient rubber-like material interposed between and mounted on said inner and outer members for resisting relative movement of said members in torsional shear.

2. A vehicle suspension comprising a supported structure, a pair of supporting wheels disposed at opposite sides of said structure closely adjacent thereto, an arm and spring means individual to each wheel mounted between the wheel and said structure, said arm being connected to said spring means for rotation about an axis, and said axis as seen from above being at an acute angle to the respective wheel axis and in proximity to said structure.

3. A vehicle suspension comprising a supported structure, supporting wheels disposed at opposite sides of said structure, spindles upon which said wheels are rotatably mounted, arm members mounted on said spindles and extending generally in the fore and aft direction of the vehicle, torsion springs mounted on said structure at the front and rear thereof and connected to said arm members for independent springing movement of the wheels relative to said structure and each of said springs as viewed from above being disposed with the spring axis inclined to the direction of wheel travel and converging toward said structure.

4. A vehicle suspension comprising a structure mounted on the vehicle for steering movement about a generally vertical axis, supporting wheels disposed at opposite sides of said structure, spindles upon which said wheels are rotatably mounted, arm members mounted on said spindles and extending generally in the fore and aft direction of the vehicle, torsion springs mounted on said structure at the front and rear thereof and connected to said arms for independent springing movement of the wheels relative to said structure and for steering movement of both wheels and said structure about said axis and each of said springs as viewed from above being disposed with the spring axis inclined to the direction of wheel travel and converging toward said structure.

5. A vehicle suspension comprising a structure mounted on the vehicle for steering movement about a generally vertical axis, supporting wheels disposed at opposite sides of said structure, spindles upon which said wheels are rotatably mounted, arm members mounted on said spindles and extending generally in the fore and aft direction of the vehicle, cylindrical torsion springs mounted in cylindrical bushings in said structure at the front and rear with axes in a generally crosswise direction thereof and as viewed from above being inclined to the direction of wheel travel and converging toward said structure and said bushings being connected to said arms for independent springing movement of the wheels relative to said structure and for steering movement of both said wheels and said structure about said axis.

6. A vehicle suspension comprising a supported structure, a pair of supporting wheels disposed at opposite sides of said structure closely adjacent thereto, a connecting arm and a torsion spring individual to each wheel mounted between the wheel and said structure providing the sole supporting connection between said structure and the wheel, said torsion spring comprising an inner and an outer member, one of said members being mounted on said supported structure and the other of said members being secured to said connecting arm, a body of resilient rubber-like material interposed between and mounted on said inner and outer members for resisting relative movement of said members in torsional shear, and each of said torsion springs as viewed from above, being disposed with the spring axis inclined to the direction of the wheel path and converging toward said structure.

7. A vehicle suspension comprising a supported structure, a pair of supporting wheels disposed at opposite sides of said structure closely adjacent thereto, spindles upon which said wheels are rotatably mounted, arm members mounted on said spindles and extending generally in the fore and aft direction of the vehicle and bent at their outer ends away from the structure thereby increasing the intervening space between said outer ends and said structure, and torsion springs mounted at said outer ends of the arms and on said structure and disposed in said intervening space.

8. A vehicle suspension comprising a steering structure mounted on the vehicle for movement about a generally vertical axis, supporting wheels disposed at opposite sides of said structure, spindles upon which said wheels are rotatably mounted, arm members mounted on said spindles and extending in a generally fore and aft direction of the vehicle, a shaft individual to each arm mounted on each of said arm members in fore and aft spaced-relation to each of said spindles, a sleeve disposed about said shaft and mounted on said steering structure, a body of resilient rubber-like material mounted between said shaft and sleeve in torque-transmitting relation thereto for resiliently cushioning vertical deflection of said wheels independently.

9. A vehicle suspension comprising a supported structure, a pair of supporting wheels disposed at opposite sides of said structure closely adjacent thereto, spindles upon which said wheels are rotatably mounted, arm members mounted on said spindles and extending generally in the fore and aft direction of the vehicle and bent at their outer ends away from the structure thereby increasing the intervening space between said outer ends and said structure, shafts mounted at said outer ends of the arms and extending into said intervening space, sleeves disposed about said shafts and mounted on said supported structure and a body of resilient rubber-like material mounted between each of said shafts and the respective sleeve in torque-transmitting relation thereto for resiliently cushioning vertical deflection of said wheels.

10. A vehicle suspension comprising a supporting structure, a pair of supporting wheels disposed at opposite sides of said structure closely adjacent thereto, an arm individual to each wheel and mounted between the wheel and said structure and a torsion spring having an axis generally transverse of the vehicle and connecting said arm and said structure for pivotal movement of said arm about the axis of said spring to cushion deflection of said wheels independently.

11. A vehicle suspension comprising a supporting structure mounted on the vehicle for steering movement about a generally vertical axis, a pair of wheels disposed at opposite sides of said structure, an arm structure individual to each wheel, said arm structure extending fore and aft of the vehicle and mounted for swinging movement about an axis generally transverse of the vehicle and for steering movement of the wheel about said generally vertical axis, said arm structure including members relatively movable about said generally transverse axis upon swinging movement of said arm structure and a body of resilient rubber-like material mounted between said members for resisting resiliently the relative movement of said members in torsional shear.

ALVIN S. KROTZ.

REFERENCES CITED

The following references are of record in the file of this patent:

UNITED STATES PATENTS

| Number | Name | Date |
|---|---|---|
| 2,244,853 | Ronning | June 10, 1941 |
| 2,254,451 | Ronning | Sept. 2, 1941 |
| 2,273,630 | Dunham et al. | Feb. 17, 1942 |

FOREIGN PATENTS

| Number | Country | Date |
|---|---|---|
| 485,077 | Great Britain | May 13, 1938 |